United States Patent [19]

Suriano et al.

[11] Patent Number: 4,843,286
[45] Date of Patent: Jun. 27, 1989

[54] VEHICLE WINDOW WIPER WITH THREE BRUSH MOTOR AND SPEED LIMITING

[75] Inventors: John R. Suriano, Kettering; Patrick J. Staarmann, Hamilton; Steven L. Tracht, Centerville; Dennis L. Mueller, Dayton, all of Ohio

[73] Assignee: General Motors Corporation, Detroit, Mich.

[21] Appl. No.: 287,672

[22] Filed: Dec. 21, 1988

Related U.S. Application Data

[63] Continuation of Ser. No. 234,993, Aug. 22, 1988, abandoned.

[51] Int. Cl.⁴ .............................................. H02P 7/06
[52] U.S. Cl. .................................... 318/443; 318/491; 318/531; 318/DIG. 2; 310/219; 388/836
[58] Field of Search ............... 318/360, 361, 429, 443, 318/444, 491, 538, DIG. 2; 310/219, 224, 225; 15/250 C, 250.12

[56] References Cited

U.S. PATENT DOCUMENTS

| | | | |
|---|---|---|---|
| 3,310,722 | 3/1967 | Diello | 318/361 |
| 3,402,337 | 9/1968 | Malmborg et al. | 318/491 X |
| 3,469,166 | 9/1969 | Burby | 310/219 X |
| 3,497,788 | 2/1970 | Kerrigan et al. | 318/361 X |

FOREIGN PATENT DOCUMENTS

| | | | |
|---|---|---|---|
| 2629747 | 1/1977 | Fed. Rep. of Germany | 318/DIG. 2 |
| 61-10982 | 1/1986 | Japan | 318/361 |

*Primary Examiner*—Bentsu Ro
*Attorney, Agent, or Firm*—Robert M. Sigler

[57] ABSTRACT

A wiper apparatus using a three brush, permanent magnet motor in which a zener diode has a cathode connected to the low speed brush and an anode connected to the high speed brush. The zener breakdown voltage of the zener diode is chosen so that it reverse conducts during at least some portion of each wipe cycle during operation with the high speed brush on a wet window to limit peak wiper speeds and reduce strain on the wiper mechanism. Variations including a transistor, relay or additional zener diode controlled by the zener diode and connected in parallel therewith provide for reduced current and therefore power dissipation in the zener diode at the expense of somewhat limited speed limiting.

10 Claims, 1 Drawing Sheet

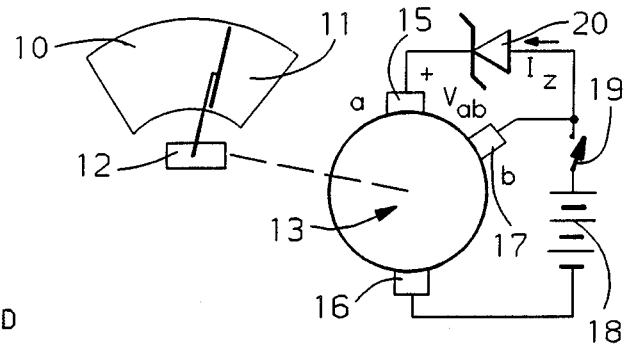
FIG. 1
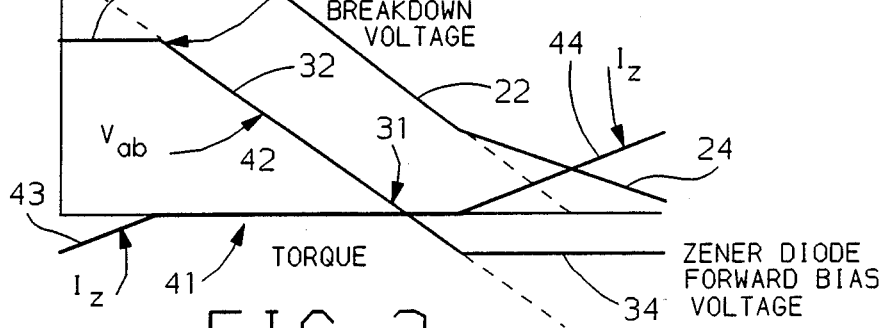
FIG. 2
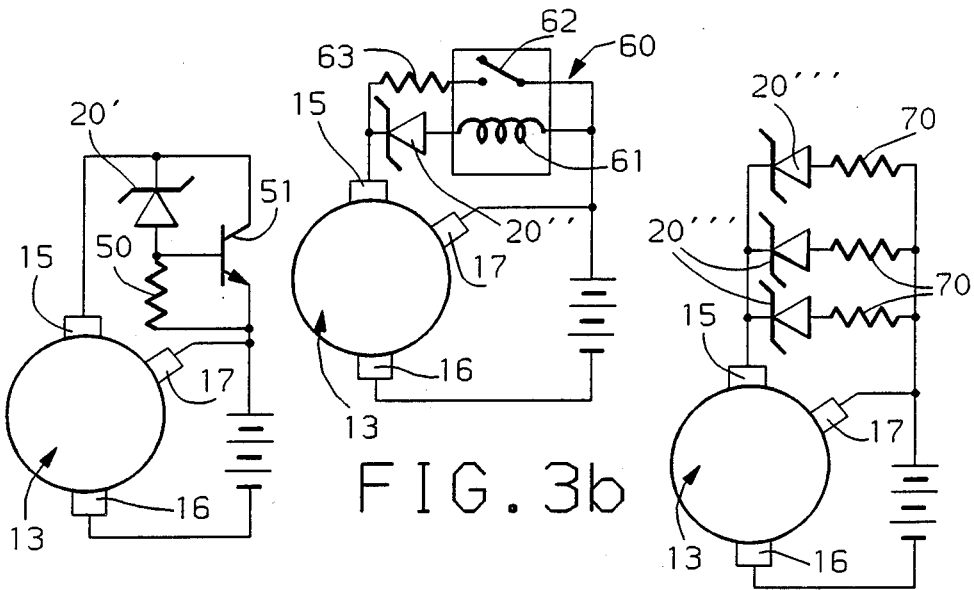
FIG. 3a
FIG. 3b
FIG. 3c

VEHICLE WINDOW WIPER WITH THREE BRUSH MOTOR AND SPEED LIMITING

This is a continuation of copending application Ser. No. 234,993, filed Aug. 22, 1988, now abandoned.

BACKGROUND OF THE INVENTION

This invention relates to a window wiper apparatus for a motor vehicle, and particularly to a two speed window wiper apparatus using a three brush permanent magnet motor. In such apparatus, the three brush motor includes two conventional brushes 180 electrical degrees apart, which are called the low speed brush and common brush, and further includes a third brush, called the high speed brush, which is offset by a predetermined electrical angle from the low speed brush so as to operate the motor and wiper at a higher speed and lower torque when the electrical power is applied across the high speed and common brushes than when it is applied across the low speed and common brushes. Such motors have been used in wiper systems for many years.

Wiper systems for vehicles must be operable over a wide range of torques and speeds, since production variability in the wiper drive mechanism and blade friction lead to differing torques and speeds under identical conditions from one vehicle to the next and, in addition, the design of the wiper drive mechanism produces a wide range of torque and speed throughout a single wipe cycle for a single vehicle. Governmental requirements dictate a minimum average speed for a wipe cycle in high speed operation; and, with the variability of torque and speed throughout the cycle, the peak speed during the cycle is significantly greater than the average speed for the cycle. When a margin is provided to ensure the required average speed, it can be necessary, for some designs, to accept the possibility of very high peak speeds of the wiper blades.

Governmental requirements also dictate a minimum wipe area, expressed as a percentage of the total window area. As motor vehicles are being designed for lower air resistance, their body shapes are becoming lower and more streamlined. This leads to larger windshields with a greater required surface area to be wiped. The larger wipe area requires larger wiper blade mechanisms with longer arms and blades; and this produces more inertial mass and greater blade tip speeds when driven with the same wiper motors in the same manner as smaller wiper mechanisms. This effect is made even greater by the fact that governmental average speed requirements are specified in terms of wipes per minute; and actual blade peak speeds increase with increased arm and blade length for a constant number of wipes per minute.

The increased blade peak speeds and inertial masses lead to more difficulty in reversing the blades at each end of the wipe pattern without overshooting and hitting the window frame. They also lead to greater strain on the wiper blade and drive mechanism in wiper operation at high speed. These effects will become of increasing concern as vehicles become lower with larger windshields.

SUMMARY OF THE INVENTION

Thus, it has become desirable to limit peak wiper speeds under low torque, high speed conditions while maintaining average wiper speeds according to governmental requirements. This invention is a wiper apparatus for a motor vehicle which provides such peak speed limiting without sacrificing the minimum speeds required under high torque conditions.

The invention comprises a vehicle window wiper apparatus using a three brush, permanent magnet motor in which a zener diode has a cathode connected to the low speed brush and an anode connected to the high speed brush. With a predetermined voltage applied across the high speed and common brushes, a voltage is generated at the low speed brush which increases, relative to that on the high speed brush, with increasing motor speed due to decreasing motor torque and armature current. The zener diode has a zener voltage which allows reverse conduction therethrough from the low speed to the high speed brush when the voltage from the low to the high speed brush reaches the zener voltage. When this conduction occurs, further increases in motor speed are limited. This limitation is not absolute, since there is an unavoidable resistive voltage drop in the armature coils and commutator, through which the zener diode current flows. However, motor speed will increase at a slower rate with decreasing motor torque once the zener diode conducts. The zener voltage may be chosen greater, relative to the expected region of motor operation on the motor speed/torque curve, so as to provide zener diode conduction only on the peaks of motor speed, or lesser, so as to conduct during a majority of the time during high speed wiper operation. The advantages and disadvantages of each of these choices will be discussed at length in the description of a preferred embodiment which follows the summary of the drawings. However, according to the invention, the zener diode is chosen with a zener voltage effective to produce reverse conduction during some portion of each wipe cycle in high speed operation on a wet window so as to at least limit peak wiper speeds on a wet window.

SUMMARY OF THE DRAWINGS

FIG. 1 shows a schematic and circuit diagram of the relevant portions of a wiper apparatus according to this invention.

FIG. 2 shows curves of motor speed, zener diode current and the voltage from low to high speed brush as functions of motor torque for the wiper apparatus of FIG. 1 with a predetermined voltage applied across the high speed and common brushes.

FIGS. 3a 3b and 3c show alternative equivalent circuit arrangements, within the scope of the invention, having greater power handling capability than the single zener diode of FIG. 1.

DESCRIPTION OF THE PREFERRED EMBODIMENT

A window of a motor vehicle, which may be the windshield 10, is adapted to be wiped by a wiper 11 driven thereacross in repeating cycles of a wipe pattern through a wiper drive mechanism 12 including a wiper motor 13. Wiper motor 13 is a standard three brush, permanent magnet motor of the type commonly used in vehicle wiper systems. It has a stationary permanent magnet field with a rotating wound armature having commutator apparatus with three brushes: a low speed brush 15 and common brush 16 fixed 180 electrical degrees apart and a high speed brush 17 fixed at an offset electrical angle from low speed brush 15. As is usual for such motors, a predetermined voltage applied across low speed brush 15 and common brush 16 produces a predetermined motor speed/torque curve which provides low speed motor and wiper operation. The same voltage applied across high speed brush 17 and common brush 16 produces a different speed/torque curve which provides high speed motor and wiper operation at a lower torque. Motor 13 is shown connected for high speed operation with a battery 18 having a high voltage terminal connected through a switch 19 to high speed brush 17 and a ground terminal connected to common brush 16. Battery 18 is an example of an electric power source providing a predetermined voltage, and represents the standard vehicle electric power supply including battery, engine driven alternator, voltage regulator, etc. Switch 19 represents that portion of the wiper operating switch which is effective, when closed, to connect the wiper for high speed operation. The apparatus described to this point is a standard wiper apparatus.

The invention comprises a zener diode 20 having a cathode connected to low speed brush 15 and an anode connected to high speed brush 17. The effect of zener diode 20 in the circuit can be shown with respect to the curves of FIG. 2. Curve 21 shows motor speed as a function of motor torque for the apparatus of FIG. 1, in which a linear central portion 22 of curve 21 is joined to a linear upper portion 23, with a different slope, at the high speed end and to a linear lower portion 24, with a different slope, at the low speed end. The center portion 22 shows the region in which zener diode 20 is not conducting; and the colinear dashed line extensions at each end show the operation of the motor if zener diode 20 were not present.

Another curve 31 shows the voltage $V_{ab}$ from low speed brush 15 to high speed brush 17 as a function of motor speed. It is also divided into linear central, upper and lower portions 32-34 similar to portions 22-24 of speed curve 21 and is also provided with dashed line extensions of central portion 32 illustrating operation without zener diode 20. Finally, a curve 41 of current $I_z$ through zener diode 20 is similarly divided into linear central, upper and lower portions 42-44, with positive current $I_z$ defined as forward conduction through zener diode 20.

With a predetermined voltage applied across high speed brush 17 and common brush 16 by battery 18 with switch 19 closed, a voltage is generated within motor 13 at low speed brush 15. This voltage is a function of motor speed. It will generally be lower than the voltage applied to the high speed brush at the lowest motor speeds and will increase with motor speed, becoming greater than the voltage applied to the high speed brush through the middle speed range and significantly greater at high motor speeds. Central portion 32 of curve 31 shows the difference $V_{ab}$ between the voltages on low speed brush 15 and high speed brush 17 with no conduction in zener diode 20; and central portion 44 of curve 41 shows that there is no zener conduction in this region, since zener diode 20 is reverse biased with a voltage less than the zener breakdown voltage.

At the low speed end of the curve, lower portion 44 of curve 41 shows the increasing forward conduction of zener diode 20 after $V_{ab}$ falls below zero by one diode voltage drop. This region of operation, as described in U.S. Pat. No. 3,469,166 to Burby, issued Sept. 23, 1969, provides an increased stall torque at the lowest motor speeds by shunting normal motor armature current from the high to the low speed brush in high torque, low speed conditions during high speed operation. This does not represent operation according to this invention, since it will occur for any diode placed in the position of zener diode 20.

Operation according to this invention is illustrated at the opposite, high speed end of the curves, where $V_{ab}$ reaches the zener breakdown voltage of zener diode 20. Upper portion 33 of curve 31 is horizontal, which indicates the action of zener diode 20 in limiting voltage $V_{ab}$ at high motor speeds. With zener diode 20 reverse conducting from low speed brush 15 to high speed brush 17 as shown in upper portion 43 of curve 41, this current produces a load which acts to slow the motor. If there were no resistive voltage drop in the armature windings and commutator of motor 13, upper portion 23 of speed curve 21 would also be flat. However, upper portion 23 of curve 21 shows some slope due to this resistive voltage drop in motor 13, although the slope is considerably less than that of central portion 22 of the curve. The smaller the resistive drop the less the slope of upper portion 23 and the more effective the speed limiting.

The apparatus of this invention requires that zener diode 20 have a zener breakdown voltage effective to provide reverse conduction through zener diode 20 in at least part of each wipe cycle of the wiper apparatus in high speed operation on a wet window. The definition of high speed operation is simply operation in which the operating armature current of the motor is provided from the electric power source to the high speed brush. A wet window is defined as a window having water on it in sufficient quantity that small variations in the quantity of water applied do not produce significant variations in speed or torque in the wiper apparatus. A completely dry window produces high torque and low speed in a wiper apparatus driving a blade across it. As more and more water is added to the windshield, the speed increases and the torque decreases at first at a significant rate. However, eventually, with the addition of sufficient water, the change in speed and torque with additional added water decreases to practically nothing. It is this amount of water that defines a wet window. Note that the requirement of reverse conduction on each cycle in high speed on a wet window distinguishes this invention from the diode shown in the aforementioned Burby patent, since that diode was not a zener diode and must therefore be provided with a reverse breakdown voltage greater than any anticipated voltage Vab so it will not be destroyed by reverse breakdown conduction.

However, within the scope of this invention, a range of zener breakdown voltages is permitted; and the range will produce somewhat different operating characteristics at its extremes. At the low zener breakdown voltage extreme, the zener breakdown voltage is less than the minimum voltage $V_{ab}$ encountered during normal operation. This corresponds to operation entirely within the upper portion 23 of speed curve 21. The advantage of this mode of operation is that the speed varies less over the full range of torque encountered, since the operation is confined to the region where the speed/torque curve has a shallower slope. This is a significant advantage, since torque generally varies widely during each wipe cycle. The rising and falling pitch of the motor and drive noise will therefore be reduced for reduced passenger annoyance. The disadvantage of this mode of operation, however, is the required power dissipation of zener diode 20, since it is conducting almost all the time.

High power zener diodes are difficult to find and expensive when they are found. In addition, good heat sinks are required, which can present device mounting complications. FIGS. 3a, 3b and 3c show several alternatives in which a low power zener diode may be used with the major portion of the power dissipated in other circuit elements; however, the additional elements add cost and complexity to the system.

The other extreme in zener breakdown voltage is a voltage just high enough to reverse conduct during the speed peaks of the wipe cycle. The advantages are lower zener power requirements for less cost and easier device mounting. The speed limiting is less overall than in the case of continuous zener conduction; and there will be a more substantial variation in motor and drive noise pitch. However, the points of speed limiting are the maximum speed points at which inertial effects are greatest, so there will be a substantial reduction in strain on the wiper drive mechanism. An additional disadvantage, which partially offsets the cost advantage, is the tighter control required over the zener breakdown voltage of the zener diodes in mass production.

FIGS. 3a, 3b and 3c show alternative embodiments to reduce heat dissipation in the zener diode, either because full time zener conduction is desired or only low power zeners are available (or both). Each of these circuits has the disadvantage of reduced speed regulation due to an additional series resistance added to the internal motor resistive voltage drop already mentioned. Therefore, speed regulation according to this invention is attained as a trade off with power dissipation in the zener diode.

FIG. 3a shows zener diode 20' having its cathode connected directly to low speed brush 15; but the anode of zener diode 20' is connected to high speed brush 17 through a biasing resistor 50 (100 ohms) which, in turn, is connected across the base/emitter junction of an NPN bipolar transistor 51 having its emitter connected to high speed brush 17, its collector connected to low speed brush 15 and its base connected to the junction of resistor 50 and the anode of zener diode 20'. The collector to emitter current path is a switched conduction path of transistor 51 and is switched by the voltage on the base, which comprises a switching electrode of transistor 51. However, the transistor is not switched in the usual sense of being turned on fully, since there must be some voltage drop remaining across it to prevent its being immediately turned off. Therefore, it is switched on into its linear region of operation. The conduction of zener diode 20' provides conduction through transistor 51, with most of the power dissipation in the latter; however, there will be a significant series resistance in transistor 51 which will somewhat increase the slope of region 23 of speed curve 21 and thus reduce the desired speed limiting.

FIG. 3b shows zener diode 20" with a cathode connected to low speed brush 15 and an anode connected to high speed brush 17 through the actuating coil 61 of a relay 60 having a normally open armature circuit 62 connected in series with a resistor 63 between low speed brush 15 and high speed brush 17. Conduction of zener diode 20" provides activation of relay 60 for a parallel current path to reduce the power dissipation in zener diode 20". Resistor 63 is required to prevent zener diode 20" and the relay coil 61 from being totally shorted out when the relay is activated; and, as in the case of resistor 50 in the transistor embodiment of FIG. 3a, resistor 63 adds an additional series resistance drop for somewhat reduced speed limiting.

FIG. 3c shows a plurality of zener diodes 20''' each in series with a resistor 70 (less than 1 ohm), with each series combination connected in parallel between low speed brush 15 and high speed brush 17. The parallel combination and the resistors 70 reduce the required power dissipation in each zener diode 20'''. Once again, however, the resistors 70 introduce additional series resistance for somewhat reduced speed limiting.

The embodiments of the invention in which an exclusive property or privilege is claimed are defined as follows:

1. In a window wiper apparatus for a motor vehicle having a wiper driven by a three brush permanent magnet motor in a repeating pattern across the vehicle window, the motor having a low speed brush and common brush 180 electrical degrees apart to drive the wiper at a low speed when provided with a predetermined voltage thereacross and further having a high speed brush at an offset electrical angle from the low speed brush to drive the wiper at a high speed with a lower torque with the predetermined voltage applied across the high speed and common brushes, the motor being effective to generate at the low speed brush, when the predetermined voltage is applied across the high speed and common brushes, a voltage which increases with respect to the voltage at the high speed brush as the motor speed increases due to decreasing motor torque, the improvement comprising:

a zener diode characterized by a predetermined zener breakdown voltage and having a cathode connected to the low speed brush and an anode connected to the high speed brush so as to conduct from the low speed brush to the high speed brush when the voltage at the low speed brush exceeds the voltage at the high speed brush by the zener breakdown voltage, the zener breakdown voltage having a value less than the peak value of voltage from the low speed brush to the high speed brush during a wipe cycle on a wet window with the predetermined voltage applied across the high speed brush and common brush so as to provide reverse conduction through the zener diode and resulting motor and wiper speed limiting at least once during each wipe cycle of the apparatus during high speed wiper operation on a wet window.

2. The window wiper apparatus of claim 1 in which the zener breakdown voltage is sufficiently small that the zener diode is in reverse breakdown conduction during substantially the entire wipe cycle.

3. The window wiper apparatus of claim 1 in which the zener breakdown voltage is sufficiently large that the zener diode is in reverse breakdown conduction only during the times of peak speed during the wipe cycle.

4. The window wiper apparatus of claim 1 in which the zener diode is connected to control the conduction of an additional circuit element so that the additional circuit element conducts only when the zener diode is in reverse conduction, the additional circuit element being connected in parallel with the zener diode so as to reduce the required conduction in the zener diode for a given speed limiting and therefore reduce the power dissipation of the zener diode in reverse conduction.

5. The window wiper apparatus of claim 4 in which the anode of the zener diode is connected to the high speed brush through a resistor and the additional circuit element is a switching transistor having a switched current path connected from the low to the high speed brush of the motor and a switching electrode connected to the junction of the zener diode and the resistor, the transistor operating in its linear range when switched on.

6. The window wiper apparatus of claim 4 in which the anode of the zener diode is connected to the high speed brush through an activating coil of a relay having a normally open armature circuit connected in series with a resistor across the low and high speed brushes, the armature circuit of the relay comprising the additional circuit element.

7. The window wiper apparatus of claim 4 in which the zener diode of claim 1 is a first zener diode having an anode connected to the high speed brush through a first resistor and the additional circuit element is a second zener diode having a cathode connected to the low speed brush and an anode connected through a second resistor to the high speed brush.

8. The method of operating a window wiper apparatus for a motor vehicle having a wiper driven by a three brush permanent magnet motor in a cyclically repeating pattern across a vehicle window, the motor having a low speed brush and a common brush 180 electrical degrees apart and further having a high speed brush at an offset electrical angle from the low speed brush effective, when provided with a voltage with respect to the common brush, both to drive the wiper at a voltage determined speed according to a speed/torque relationship characterized by a first ratio of speed to torque within a first speed range and also to generate at the low speed brush a voltage which increases with respect to the voltage at the high speed brush as the motor speed increases due to decreasing motor torque, the apparatus further having a zener diode with a cathode connected to the low speed brush and an anode connected to the high speed brush and characterized by a zener breakdown voltage so as to conduct from the low speed brush to the high speed brush when the voltage at the low speed brush exceeds the voltage at the high speed brush by the zener breakdown voltage and thus create a second ratio of speed to torque, smaller than the first ratio of speed to torque, within a second speed range higher than the first speed range, the method comprising:

operating the window wiper apparatus through repeated cycles of the wipe pattern on a wet window with a voltage applied to the high speed brush with respect to the common brush and a zener breakdown voltage providing conduction of the zener diode from the low speed brush to the high speed brush with resulting wiper speed limiting during at least part of each wipe cycle.

9. The method of claim 8 in which the conduction of the zener diode from the low speed brush to the high speed brush occurs during only the highest speed portion of each wipe cycle.

10. The method of claim 8 in which the conduction of the zener diode from the low speed brush to the high speed brush occurs throughout each wipe cycle.

* * * * *